April 16, 1968
C. D. SHRADER
3,377,706
COMBINED COMPUTER AND PLOTTER FOR AERONAUTICAL, NAUTICAL
AND SIMILAR USES
Filed Oct. 8, 1965
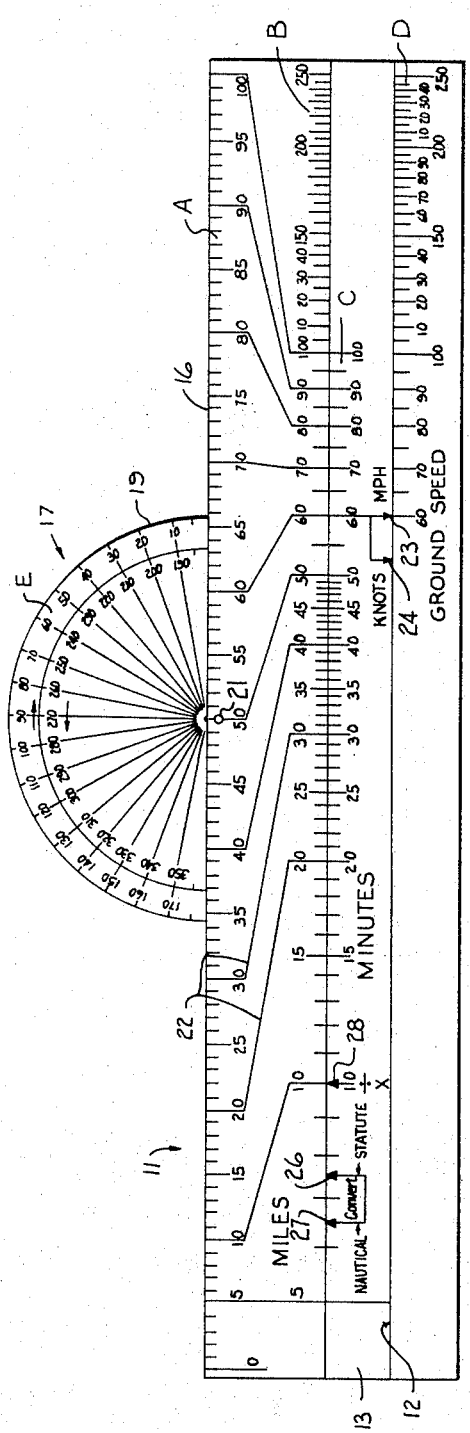
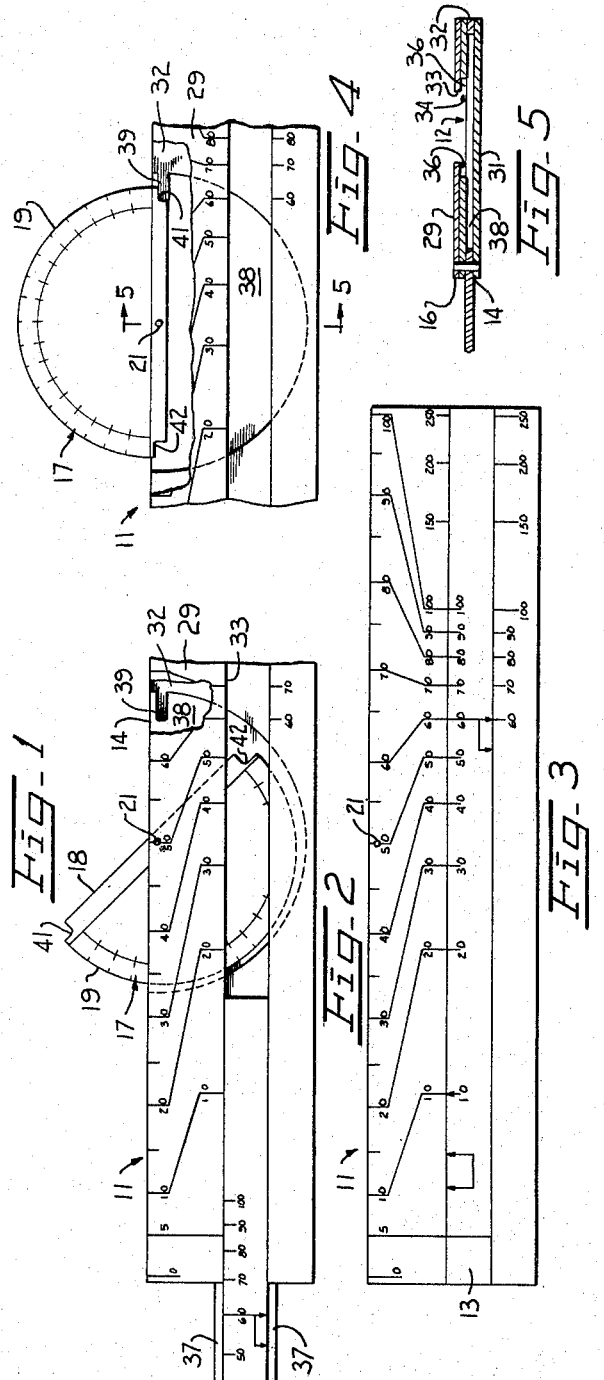
INVENTOR.
CHARLES D SHRADER
BY
Gardner & Zimmerman
ATTORNEYS

United States Patent Office 3,377,706
Patented Apr. 16, 1968

3,377,706
COMBINED COMPUTER AND PLOTTER FOR AERONAUTICAL, NAUTICAL AND SIMILAR USES
Charles D. Shrader, 427 E. Lewelling Blvd., San Lorenzo, Calif. 94580
Filed Oct. 8, 1965, Ser. No. 494,217
3 Claims. (Cl. 33—75)

ABSTRACT OF THE DISCLOSURE

This disclosure describes an instrument which is a combination of a slide rule computer and a chart plotter of the type used in navigation. The instrument comprises an elongated rectangular strip having a plotter scale adjacent a first longitudinal edge thereof and a semi-circular protractor pivotally secured thereto at such edge for movement between an exposed position in which the protractor cooperates with the scale in plotting on a chart and a retracted position in which the protractor is housed within a slot in the strip. The strip also includes an elongated channel extending lengthwise of one of its faces and in which a computer slide is mounted for slidable translation. Appropriate computer scales are provided on the strip adjacent the channel and on the slide so that distance, time or speed can be computed. The plotter scale is correlated with the computer scales to facilitate the making of navigational calculations.

---

This invention relates to devices for assisting in navigation, and the like, and is more particularly directed to a combined computer and plotter for this purpose.

In navigation, particularly as practiced by non-professional pilots, a plotter is typically employed to measure distances, angles, courses, etc., on pertinent charts or maps. The information derived with the plotter is in turn applied to a computer to calculate various factors required in the piloting of the aircraft on a given course. The procedure is sometimes reversed, factors such as speed, time, and distance may be ascertained with the computer and applied to the chart by means of the plotter. Generally, the plotter is in the form of a flat strip of material, such as plastic, having one or more fixed distance or miles scales on its surfaces, and a protractor extending from the strip having angle graduations to facilitate the measurement of angles and plotting of courses. The computer is typically in the form of a slide rule, usually circular, arranged and calibrated for its intended purpose. Thus, it is necessary to manipulate two separate instruments in order to solve simple navigational problems, which to a busy pilot in a crowded cockpit, is rather cumbersome.

It is an object of the present invention to provide a single compact instrument in which the functions of a plotter and computer are combined.

Another object of the invention is the provision of a combined computer and plotter of the class described which is smaller than conventional plotter and easier to handle than a separate plotter and separate computer.

Still another object of the invention is to provide an instrument of the class described which permits the computation and measurement of known and unknown factors of distance, time, and speed to be made almost instantly and without necessity of litfing the instrument from a chart.

It is a further object of the invention to provide a combined computer and plotter having a protractor that is retractable when the instrument is not in use to thereby provide an extremely compact instrument.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

FIGURE 1 is a plan view of a combined plotter and computer in accordance with the invention, the protractor portion of the instrument being illustrated in extended operable position.

FIGURE 2 is a fragmentary plan view of the instrument with portions broken-away, illustrating the protractor in partially recessed position.

FIGURE 3 is a plan view of the instrument with the protractor in fully recessed inoperable position.

FIGURE 4 is a fragmentary plan view of the instrument with portions broken-away illustrating the protractor in extended operable position and in engagement with a stop for establishing the proper extended operable and retracted inoperable positions of the protractor.

FIGURE 5 is a sectional view taken at line 5—5 of FIGURE 4.

Referring now to the drawing, FIGURE 1 in particular, the combined plotter and computer instrument in accordance with the invention will be seen to generally include an elongated rectangular strip 11 of plastic, metal, wood, or equivalent structural material, having a longitudinally extending recess or channel 12 in a face thereof. Mounted within the channel 12 there is provided a longitudinally translatable, longitudinally elongated rectangular slide 13 having a length equal to that of the strip 11. The strip is also provided with a slot 14 extending transversely into one of its longitudinal edges 16 substantially centrally thereof. The slot preferably has a semi-circular configuration in plan cross-section, the diameter of the semi-circle coinciding with the edge 16. The slot 14 serves to house a retractable semi-circular protractor 17 having a linear diametric edge 18 and arcuate edge 19 extending between the opposite ends of the linear edge. The protractor is pivotally mounted between the opposite sides of the slot 14, as by means of a pivot pin 21 extending through the strip 11 and protractor. The pivotal mounting is such that the protractor may be selectively pivoted between a fully extended operable position, as shown in FIGURE 1, wherein the arcuate edge 19 projects from the strip side edge 16, and a completely retracted inoperable position, as shown in FIGURE 3, wherein the arcuate edge is fully retracted in the slot and linear edge 18 coincides with edge 16. In this manner, the protractor may be placed in operable position for use, and retracted when not in use to provide a compact instrument.

A suitable plotter scale A is imprinted, or otherwise provided, on the fact of strip 11 containing the channel 12 adjacent the side edge 16. This scale is linearly calibrated in terms of distance, preferably statute miles. A computer scale B is provided on the same face of the strip adjacent the longitudinal edge of channel 12 which is proximal with respect to the edge 16. Scale B is calibrated in the same units as scale A, i.e., distance or statute miles, but is appropriately arranged to form a slide rule scale instead of being a linear scale. As an aid to correlating the plotter and computer distance scales A and B, corresponding units thereof are connected by lines 22 at convenient increments, such as every 10 miles as shown. The face of the slide 13 that is flush with the face of strip 11 is provided with a computer scale C along the edge thereof that is directly adjacent scale B. The calibrations of scale C correspond to those of scale B, however scale C is representative of time and has units of, for example, minutes. A third computer scale D is provided on the face of strip 11 adjacent the opposite edge of channel 12 from scale B. Scale D is appropriately calibrated in terms of ground speed and the calibrations represent miles per hour or knots. Miles per hour and knots index markings 23, 24 are provided on the slide 13 adjacent scale D for selective alignment with the calibrations thereof. Similarly, statute and nautical miles index markers 26, 27 are provided on slide 13 adjacent scale B for selective alignment with the calibrations thereof, as is an index marker 28 for the division or multiplying of other factors such as fuel range, consumption per hour, etc. The protractor 17 is provided with a scale E adjacent the arcuate edge 19 calibrated in angular increments.

It will thus be appreciated that in the use of the combined plotter and computer, the protractor 17 is pivoted to its extended operable position. The distance scale A of the strip and angle scale E of the protractor combine to form a plotter. Distance readings of the plotter scale A may be directly correlated to the computer scale B by virtue of the interconnecting lines 22. The slide 13 may then be translated to position a known time calibration of scale C opposite a measured distance calibration on scale B, and the required speed in either miles per hour or knots is read on scale D opposite the index markers 23 or 24. Conversely with a known speed and time, the corresponding distance may be read on scale B and immediately transferred to the plotter distance scale A. With any two of the time, distance, and speed factors known, the third can be found instantly by appropriate setting of the slide. Nautical and statute miles may be equated by means of the index markers 26, 27. Knots and miles per hour may be equated by means of the index markers 23, 24. Other factors may be found with the aid of index marker 27. All of the foregoing computer operations may be accomplished without lifting the instrument from a map or chart. The protractor 17 may be retracted when the instrument is not in use to thereby provide a single plotter and computer instrument that is much more compact than either a conventional plotter or computer alone.

Considering now the preferred structure of the combined plotter and computer to the foregoing ends, the strip 11 is preferably of three-ply construction including face portions 29, 31 and an interposed spacer portion 32. The face portion 29 that is provided with scales A, B, and D includes a longitudinal rectangular slot 33 extending the entire length thereof. The spacer portion 32 is provided with a longitudinally extending rectangular groove 34 of greater width than slot 33 and subjacent same. The slot and groove define the channel 12 which has transversely undercut guide slots 36 along the opposite longitudinal sides thereof. The guide slots serve to receive transversely projecting longitudinally extending flanges 37 along the opposite sides of the slide 13.

The slot 14 for housing the protractor 17 is then provided as a semi-circular recess 38 in the opposite face of the spacer portion 32 from that containing the rectangular groove 34. The lower end of the recess 38 communicates with the groove 34, as best shown in FIGURE 2, such that when the slide 13 is translated to one side of the strip 11, the protractor 17 is accessible through the channel 12 for pivoting between operable and inoperable positions. In this regard, the pivot pin 21 extends through the face portions 29, 31 adjacent the edge 16 and through the protractor 17 adjacent linear edge 18 at the center thereof. The pin is thus substantially at the center of the semi-circle defining the protractor. The protractor, accessible through the channel 12, is hence pivoted 180° to move same between its operable and inoperable positions. Stop means are provided to locate the protractor in either of these positions. Preferably, the stop means comprises a rectangular detent 39 formed in spacer portion 32 to project longitudinally into semi-circular recess 38 parallel to and closely adjacent the edge 16 of strip 11. The detent is adapted to engage rectangular notches 41, 42 provided in protractor 17 at the opposite ends of linear edge 18. The detent engages notch 41 when the protractor is in extended operable position as shown in FIGURE 4. It will be seen from the drawing that when the protractor is in its operable position, the 0° reference line is coextensive with the upper longitudinal edge of the strip such that the strip edges acts as a continuation of the reference line. Upon pivoting of the protractor 180° to its retracted inoperable position, the detent engages the other notch 42.

What is claimed is:

1. A mechanical arrangement for a combined computer and plotter comprising an elongated rectangular strip having a longitudinally extending rectangular channel in a face thereof, said strip having a semi-circular slot extending into a first longitudinal edge thereof between opposed faces of said strip and having its diameter along said edge, said faces being linear and unbroken at said edges, an elongated rectangular slide mounted for translation in said channel, a semi-circular protractor having a linear edge and an arcuate edge and having a protractor angle scale on one face thereof, and pivot means disposed adjacent said linear edge at the radial center of said slot and secured to said protractor at the radial center thereof mounting said protractor in said slot for selective movement between positions wherein said arcuate edge projects from said first edge and wherein said arcuate edge is fully retracted in said slot, said protractor having notches at the opposite ends of said linear edge thereof and a detent projecting into said slot parallel to and closely adjacent said first edge of said strip for engagement with said notches respectively when said protractor is in opposed positions of 180° rotation, said detent and one of said notches being positioned for engagement when said longitudinal edge of said strip is coextensive with the 0° reference line of the protractor scale.

2. A combined computer and plotter for navigational purposes comprising an elongated rectangular strip formed of opposed face portions and an interposed spacer portion, a first of said face portions having a longitudinally extending slot communicating with a subjacent longitudinally extending recess in a first face of said spacer portion, said recess having a greater width than said slot and defining a channel therewith, said spacer portion having a semi-circular recess in a second face thereof with a diameter extending along a first longitudinal edge of said strip, said semi-circular recess communicating with said longitudinally extending recess, a slide mounted in said channel for longitudinal translation, a semi-circular protractor disposed in said semi-circular recess and having a longitudinal edge and arcuate edge, said linear edge having rectangular notches at its opposite ends, a pivot pin extending through said face portions at the radial center of said semi-circular recess and through said protractor at the radial center thereof, a detent projecting from said spacer portion into said semi-circular recess parallel and adjacent said first longitudinal edge, said detent engageable with said notches, said first face portion having a plotter scale adjacent said first longitudinal edge and first and second computer scales adjacent the opposite longitudinal edges of said longitudinally extending slot with calibrations of said first computer scale corresponding to calibrations of said plotter scale and connected thereto by lines, said slide having a third computer scale along an edge thereof adjacent said first computer scale and index markings adjacent the opposite edges of said slide.

3. A combined computer and plotter comprising a elongated rectangular strip having a longitudinally extending rectangular channel in a face thereof and a slot extending into a first longitudinal edge thereof with said face being linear and unbroken at said edge, an elongated rectangular slide mounted for translation in said channel, a semi-circular protractor having a generally linear edge and an arcuate edge and having a protractor angle scale on one face thereof, means mounting said protractor in said slot for selective movement between positions wherein said arcuate edge projects from said first edge and wherein said arcuate edge is fully retracted in said slot, said protractor being notched at the opposite ends of said linear edge thereof, and a detent projecting into said slot closely adjacent said first edge of said strip for engagement with the notches in said protractor respectively when said protractor is in opposed positions of 180° rotation, said detent and one of said notches being positioned for engagement when said first strip edge is coextensive with the 0° reference line of the protractor scale, said strip having a plotter scale adjacent said first longitudinal edge thereof and first and second computer scales adjacent the opposite longitudinal edges of said channel with calibrations of said first computer scale corresponding to calibrations of said plotter scale and connected thereto by lines, said slide having a third computer scale along an edge thereof adjacent said first computer scale and index markings adjacent the opposite edges of said slide.

References Cited

UNITED STATES PATENTS

| | | | |
|---|---|---|---|
| 85,991 | 1/1869 | Briggs | 33—75 |
| 1,475,999 | 12/1923 | Jaray | 235—70 |
| 2,389,369 | 11/1945 | Kittleson | 33—111 |
| 2,425,097 | 8/1947 | Isom | 33—76 |
| 2,517,196 | 8/1950 | Georgion | 235—70 |
| 2,545,935 | 3/1951 | Warner | 33—1 X |

FOREIGN PATENTS 246,583    10/1947    Switzerland.

HARRY N. HAROIAN, *Primary Examiner.*